United States Patent [19]

Stobby

[11] Patent Number: 4,661,533

[45] Date of Patent: Apr. 28, 1987

[54] RIGID POLYURETHANE MODIFIED POLYISOCYANURATE CONTAINING FLY ASH AS AN INORGANIC FILLER

[75] Inventor: William G. Stobby, Granville, Ohio

[73] Assignee: The Dow Chemical Company, Midland, Mich.

[21] Appl. No.: 791,654

[22] Filed: Oct. 28, 1985

[51] Int. Cl.[4] ............................................. C08G 18/14
[52] U.S. Cl. .................................. 521/122; 521/131; 521/160; 521/902; 521/906
[58] Field of Search ............... 521/122, 131, 160, 902, 521/906

[56] References Cited

U.S. PATENT DOCUMENTS

| | | | |
|---|---|---|---|
| 3,830,776 | 8/1974 | Carlson et al. ................... | 106/288 B |
| 3,917,547 | 11/1975 | Massey ................................ | 521/91 |
| 4,164,526 | 8/1979 | Clay et al. ............................ | 521/103 |
| 4,366,204 | 12/1982 | Briggs .................................. | 428/331 |
| 4,425,440 | 1/1984 | Bloembergen et al. .............. | 521/81 |

*Primary Examiner*—Maurice J. Welsh
*Attorney, Agent, or Firm*—G. C. Cohn

[57] ABSTRACT

This invention is a closed cell, rigid polyurethane-modified polyisocyanurate foam containing from about 10 to about 80 percent by weight of the foam of fly ash, which polyurethane-modified polyisocyanurate foam is prepared from a polyurethane-modified polyisocyanurate foam-forming composition which, when foamed to a density of about 1.75 pounds per cubic foot in the absence of the fly ash, forms a foam having a compressive modulus of about 150 to 325 pounds per square inch.

8 Claims, No Drawings

4,661,533

RIGID POLYURETHANE MODIFIED POLYISOCYANURATE CONTAINING FLY ASH AS AN INORGANIC FILLER

BACKGROUND OF THE INVENTION

This invention relates to rigid polyurethane modified polyisocyanurate foams, particularly highly filled foams containing fly ash an an inorganic filler.

Rigid polyurethane and polyisocyanurate foams are widely used as structural members, and particularly as insulative structural members. As with other polymeric materials, it is often desirable to reduce the polymer content and improve the properties of these members by the addition of inorganic fillers. Unfortunately, it has proven difficult to provide a rigid polyurethane or polyisocyanurate foam containing more than about 10% by weight of such fillers. These fillers tend to rupture the cells of the foam, which in turn dramatically reduces its insulative capacity. Another undesirable effect of high levels of fillers is that they cause the foam to be very friable. Since higher filler levels are desired because they provide a less expensive material and certain physical property improvements, it would be highly desirable to provide a highly filled, rigid polyurethane-modified polyisocyanurate foam which has good insulative properties and low friability.

SUMMARY OF THE INVENTION

In one aspect, this invention is a closed cell, rigid polyurethane-modified polyisocyanurate foam containing from about 10 to about 80 percent, by weight of the foam, of fly ash. The polyurethane-modified polyisocyanurate foam is prepared from a polyurethane-modified polyisocyanurate-forming composition which, when foamed to a density of about 1.75 pounds per cubic foot in the absence of the fly ash, forms a foam having a compressive modulus of about 150 to 325 pounds per square inch.

The foam of this invention is characterized in having excellent thermal insulative properties, low friability and good compressive strength. These properties are highly surprising in view of the high levels of filler in the foam. A further advantage of the foam of this invention is that these desirable properties are achieved at a significantly lower foam cost than conventional rigid polyurethane-modified polyisocyanurate foams. These desirable properties make the foam of this invention useful, for example, as board insulation, sheathing insulation, pipe insulation and the like.

DETAILED DESCRIPTION OF THE INVENTION

The foam of this invention is characterized in that about 10 to about 80% by weight of the foam is comprised of fly ash. Fly ash is a product derived from the condensation of inorganic ash produced in burning coal, such as in a coal-fired power plant. Fly ash particles tend to be spherical in shape. There exist two major types of fly ash. Type F fly ash is a low calcium oxide content ash, whereas type C fly ash is a high calcium oxide content ash. Both types are useful in this invention. The fly ash advantageously has a volume-average particle size of less than about 200 microns, preferably about 0.1 to about 100 microns and more preferably about 10-20 microns. In general, the smaller particle sizes cause substantially less cell rupture than coarser particles. However, very small particles are more expensive and are less desirable for that reason. In addition, it is preferred to employ fly ash which is basic or only mildly acidic. Such preferred fly ash forms a 10% by weight suspension in neutralized water having a pH of at least about 5, preferably at least about 7.

The fly ash comprises about 10 to about 80, preferably about 35 to about 60 percent of the weight of the foam of this invention. Within the preferred range, the properties of low friability, low shrinkage and good thermal insulative capacity are optimized.

The foam of this invention is prepared from a curable polyurethane-modified polyisocyanurate foam-forming composition which, when cured in the absence of the fly ash or other inorganic filler, forms a foam having a compressive modulus of about 150–320 pounds per square inch (psi) at a density of about 1.75 pounds per cubic foot (pcf). Less rigid foams have a smaller proportion of isocyanurate groups and are therefore more flammable than desired. More rigid foams become very friable when highly filled.

One critical component of the foam-forming formulation is an organic polyisocyanate. Suitable polyisocyanates include aliphatic as well as aromatic polyisocyanates. Such polyisocyanates are described, for example, in U.S. Pat. Nos. 4,065,410, 3,401,180, 3,454,606, 3,152,162, 3,492,330, 3,001,973, 3,394,164 and 3,124,605, all incorporated herein by reference.

Aromatic polyisocyanates particularly useful herein include 2,4- and/or 2,6-toluenediisocyanate, 2,4'- and or 4,4'-diphenylmethanediisocyanate, p-phenylenediisocyanate, polymethylenepolyphenylpolyisocyanates, mixtures thereof and the like. Also useful are polymeric derivatives of 4,4'-diphenylmethanediisocyanate as well as prepolymers and quasi-prepolymers thereof. Most preferred among these are the isomers of toluenediisocyanate and diphenylmethanediisocyanate.

Particularly useful aliphatic polyisocyanates include the hydrogenated derivatives of the foregoing aromatic polyisocyanates, as well as hexamethylenediisocyanate, isophoronediisocyanate, 1,4-cyclohexanediisocyanate and the like.

In addition to the polyisocyanate, the foam-forming formulaton also contains an organic compound containing two or more isocyanate-reactive groups (hereinafter called "isocyanate-reactive compounds"). Suitable such compounds include polyols, polyamines, polyacids, polymercaptans and like compounds. Such compounds are described, for example, in columns 3–5 of U.S. Pat. No. 4,394,491, incorporated herein by reference. Preferred are glycol ethers, polyester polyols, polyether polyols and aminated polyethers, with polyols being particularly preferred. Polyether polyols are most preferred.

The equivalent weight of the isocyanate-reactive compound and the relative amounts of polyisocyanate and isocyanate-reactive material are chosen such that when the formulation is foamed in the absence of the fly ash or any inorganic filler, it exhibits a compressive modulus of about 150–320 psi at a density of 1.75 pcf. In general, increasing the isocyanate index (defined herein as 100 times the ratio of isocyanate equivalents to active hydrogen equivalents) increases the compressive modulus of the foam. In addition, decreasing the equivalent weight of the isocyanate-reactive material increases the compressive modulus of the foam. Thus, the use of a high isocyanate index permits the use of somewhat higher equivalent weight isocyanate-reactive materials. Conversely, the use of very low equivalent weight isocyanate-reactive materials limits the isocyanate index.

An excess of the polyisocyanate is required in order to prepare a polyisocyanurate foam. Generally, an isocyanate index of about 150 to about 700 is suitable. Preferably, the isocyanate index is about 200 to about 500, because in this range the best combination of the properties of thermal insulative capacity, friability and the like is achieved.

The equivalent weight of the isocyanate reactive material can range from about 31 to about 1500 or higher. However, at the low end of this range, the isocyanate index must also be quite low in order to meet the limit on compressive modulus. This can cause the resulting foam to have poorer burn properties than desired. At the high end of this range, it is required to use a very high index in order to achieve the desired compressive modulus. A high index formulation is less desired since it is usually necessary to post-cure the foam to complete the trimerization reaction. Accordingly the equivalent weight of the isocyanate-reactive compound is preferably about 100 to about 500. Most preferably, the isocyanate-reactive compound is a polyester polyol or polyether polyol having an equivalent weight of about 100 to 500, with the polyether polyols being most preferred, especially when a formulation which has an unfilled compressive modulus below 200 psi at 1.75 pcf is desired.

The isocyanate-reactive compound advantageously has a functionality of about 2 to about 8. Due to the substantial crosslinking formed by the trimerization of the polyisocyanate, lower functionality isocyanate-reactive compounds having about 2-4, particularly about 2-3, active hydrogen-containing moieties per molecule are preferred.

Suitable isocyanate-reactive compounds include, for example, glycols and glycol ethers such as ethylene glycol, propylene glycol, diethylene glycol, dipropylene glycol, triethylene glycol, tripropylene glycol, 1,4-butanediol, 1,6-hexanediol and the like; aliphatic polyamines such as hexamethylenediamine; aromatic diamines such as phenylene diamine, toluene diamine and diethyltoluenediamine; polyester polyols prepared in the reaction of a diacid or acid anhydride with a diol and having an equivalent weight from about 100 to about 1500; polyether polyols having an equivalent weight from about 100 to 1500, especially poly(ethylene oxide) and/or poly(propylene oxide) polymers of 2-4 functionality and 100 to 500 equivalent weight; and amine-terminated polyethers prepared in the reductive amination of the aforementioned polyether polyols.

The most preferred isocyanate-reactive compounds are polymers of ethylene oxide having an equivalent weight from about 100 to about 500.

The urethane-modified polyisocyanurate foam forming formulation further comprises a blowing agent. Any material which generates a gas under the conditions of the curing reaction of the foam-forming formulation is suitable. Water, finely particulate solids, the so-called azo blowing agents, and low boiling compounds such as halogenated alkanes are exemplary blowing agents. Of these, water and the halogenated alkanes are preferred, and the halogenated alkanes are especially preferred due the the superior thermal properties achieved with their use. Exemplary halogenated alkane blowing agents include methylene chloride, monochloromonofluoromethane, dichlorodifluoromethane, dichloromonofluoromethane, difluoromonochloromethane and the like. The use of blowing agents to form cellular polyurethane foams is well known. The amount of blowing agent employed is chosen so that the resulting foam has the desired density. Higher amounts of blowing agents generally lead to lower density foams. The preferred halogenated alkane blowing agents are preferably used in amount from about 2 to about 40% of the combined weight of polyisocyanate and isocyanate-reactive compounds.

The urethane-modified polyisocyanurate composition also advantageously comprises a catalyst for the trimerization of the polyisocyanate to form isocyanurate rings. Such catalysts are well known in the art and include, for example, oxides such as $Li_2O$, $(BuSn)_2O$ and $R_3AsO$ wherein R is lower alkyl; alkoxides such as $NaOCH_3$, potassium t-butoxide and diverse borates; tertiary amines such as triethylamine, benzyldimethylamine and triethylenediamine; hydrides such as sodium borohydride, hydroxides of quarternary nitrogen, phosphorus, arsenic and antimony; and diverse carboxylates such as sodium formate, sodium benzoate, potassium acetate and alkali soaps as well as other carboxylates such as calcium diacetate, lead oleate and the like.

A urethane catalyst, i.e. one which catalyzes the rate of the reaction of the polyisocyanate and the isocyanate reactive compound is also advantageously used herein. Generally, any of the well-known urethane catalysts are useful herein including, for example, organometal compounds, tertiary amines, alkali metal alkoxides, mixtures thereof and the like. The organometal and tertiary amine catalysts are generally preferred. Suitable organometal catalysts include, for example, organic compounds of tin, zinc, lead, mercury, cadmium, bismuth, antimony, iron, manganese, cobalt, copper, vanadium, and the like, especially carboxylic acid salts of those metals, particularly carboxylic acid salts having from about 2 to 20 carbon atoms. Suitable amine catalysts include, for example, triethylene diamine, triethylamine, tetramethylbutane diamine, N,N-dimethylethanolamine, N-ethylmorpholine and the like.

The trimerization catalyst and urethane catalyst are each advantageously employed in quantities from about 0.001 to about 10, preferably about 0.01 to about 2 parts by weight per 100 parts of polyisocyanate and isocyanate-reactive compounds. Very weak catalysts can be employed in somewhat greater amounts.

It is also generally desirable to employ a surfactant in the foam forming formulation. Such surfactant helps to stabilize the cells formed in the curing reaction. Silicone surfactants are especially preferred for this purpose and are typically employed in amounts from about 0.05 to about 5% of the total weight of the formulation.

Other ingredients which may optionally be included in the foam-forming formulation include, for example, colorants, reinforcing agents, mold release agents, flame retardants, fillers, antioxidants and the like. The use of these and other additives are well known to those skilled in the relevant arts.

In preparing the urethane-modified polyisocyanurate foam, it is customary to mix all components except the polyisocyanate, and then add in the polyisocyanate. However the order of mixing is not critical if the fly ash is homogenously blended into the foam forming formulation and the reaction of the polyisocyanate and isocyanate-reactive compound does not begin until all components are mixed. Preferably, the isocyanate-reactive compound, catalyst, blowing agent and surfactant are first mixed and then combined with the fly ash. The wetted fly ash is then combined with the polyisocyanate and the mixture foamed.

Foaming can be conducted at a temperature from about 20° to about 150° C. Preferably, the foam forming formulation is permitted to foam at a relatively low temperature, i.e. 20°–50° C. until a dimensionally stable foam is obtained and optionally subsequent curing at at higher temperature, i.e. 50°–150° C. can be performed to assure that the trimerization reaction is completed. Foaming can be conducted in a mold, or between sheets of foil, paper, film and the like to form a "sandwich" structure or by permitting the foaming formulation to freely rise.

The product urethane-modified polyisocyanurate foam is a rigid, closed cell product having excellent thermal insulative properties, low friability, and good compressive strength. In this invention, a closed-cell foam is one in which fewer than about 15, preferably fewer than about 10 percent by number of the cells are open. The foam typically exhibits an initial k factor of less than about 0.15, preferably lower than about 0.14 and more preferably less than about 1.135 Btu in/°F./hr/ft. K-factor is a value which reflects a foam's insulation potential to reduce heat flow when subjected to a temperature gradient across opposite surfaces. The foam of this invention is useful, for example, as board-type insulation, as a replacement for dry-wall applications and in other structural applications.

The following examples are provided to illustrate the invention but are not intended to limit the scope thereof. All parts and percentages are by weight unless otherwise indicated.

EXAMPLE 1

The following base formulation is used to prepare a series of urethane-modified polyisocyanurate foams:

| | |
|---|---|
| Liquid MDI[1] | 200 parts by weight |
| Poly(ethylene oxide) diol | 90 parts by weight |
| Potassium Acetate solution[2] | 3 parts by weight |
| Silicone Surfactant[3] | 2.2 parts by weight |
| Tertiary Amine Catalyst[4] | 3 parts by weight |
| Monochloromonofluoromethane | Variable |
| Fly Ash "C" | Variable |

[1]A modified diphenylmethanediisocyanate commercially available as Mondur MR from Mobay Chemical Co.
[2]25% Potassium acetate in diethylene glycol
[3]DC-193, from Dow Corning Corporation
[4]DMP-30, from Rohm and Haas Company Comparative foams A–D are prepared in the absence of fly ash and with varying levels of blowing agent, as indicated in Table I following. Foam Samples 1–8 contain varying levels of fly ash and blowing agent, as indicated in Table I following. The various foams are prepared by hand mixing all ingredients except the fly ash, polyisocyanate and blowing agent in a cup. The fly ash (in Foam Samples 1–8 only) is then carefully mixed into this mixture so that complete wetting of the particles is achieved. The blowing agent is then mixed in, followed by the polyisocyanate. The total formulation is mixed for about 5 seconds, poured into a paper tub and permitted to freely rise at room temperature. After the foam has risen and set, it is cured in an oven for 30 minutes at 80° C.

After curing, the foam is cooled to room temperature. The compressive strength is determined according to ASTM C-165-77. Compressive modulus is determined by measuring the maximum slope of the pressure vs. time curve obtained from measuring the 10% deflection or yield compressive strength. The density, percentage of open cells and k factor are measured according to ASTM methods C-303-77, D-2856-70, and C-518-76, respectively. Flame spread is measured according to ASTM D3806. Friability is subjectively determined by rubbing a corner of a foam sample. The friability of the sample is then rated according to the following scale. Excellent: No abrasion loss; Good: some abrasion loss mostly associated with surface fracturing. Good recovery after compression; Fair: powder forms, some recovery after compression; Poor: Powder easily forms and no recovery is observed after compression. The results of these tests are as reported in Table I following.

For comparison, Comparative Foams E–H are prepared from the following base formulation:

| | |
|---|---|
| Liquid MDI[1] | 200 parts by weight |
| Diethyleneglycol | 24 parts by weight |
| Potassium Acetate Solution[2] | 3 parts by weight |
| Silicone Surfactant[3] | 2.2 parts by weight |
| Tertiary Amine Catalyst[4] | 3 parts by weight |
| Monochloromonofluoromethane | Variable |
| Fly Ash "C" | Variable |

[1]A modified diphenylmethanediisocyanate commercially available as Mondur MR from Mobay Chemical Co.
[2]25% Potassium acetate in diethylene glycol
[3]DC-193, from Dow Corning Corporation
[4]DMP-30, from Rohm and Haas Company These foams are prepared in the same manner as Comparative foams A–D and Samples 1–8, and tested in similar manner. The results of this testing are as indicated in Table I following.

TABLE I

| | Sample Numbers | | | | | | | |
|---|---|---|---|---|---|---|---|---|
| | 1 | 2 | 3 | 4 | 5 | 6 | 7 | 8 |
| Density (pcf) | 2.16 | 2.49 | 2.99 | 2.36 | 1.93 | 2.87 | 2.33 | 3.81 |
| % Fly Ash | 23 | 38 | 38 | 38 | 38 | 48 | 48 | 58 |
| K-Factor | 0.120 | 0.123 | 0.118 | 0.123 | 0.131 | 0.123 | 0.131 | 0.128 |
| Comp. Modulus (psi) | N.D. | 676 | 561 | 371 | 242 | 449 | 302 | N.D. |
| Flame Spread (in) | N.D. | 72 | 60 | 65 | 65 | 55 | 54 | N.D. |
| Friability | E | G | G | G | G | G | G | F |
| % open cells | 10.6 | 4.6 | 5.1 | 6.7 | 8.0 | 5.3 | 6.3 | 9.4 |
| | A* | B* | C* | D* | E* | F* | G* | H* |
| Density | 2.34 | 1.91 | 1.56 | 1.33 | 1.75 | 1.95 | 2.29 | 2.44 |
| % Fly Ash | 0 | 0 | 0 | 0 | 0 | 9 | 18 | 25 |
| K-Factor | 0.126 | 0.122 | 0.130 | 0.139 | 0.130 | 0.126 | 0.122 | 0.124 |
| Comp. Modulus | 491 | 288 | 182 | 128 | 371 | 364 | 459 | 472 |
| Flame Spread | 88 | 86 | 74 | 69 | 39 | 30 | 42 | 49 |
| Friability | E | E | E | E | E | G | G | F |

TABLE I-continued

| % open cells | 7.5 | 7.8 | 9.7 | 9.9 | 4.8 | 8.9 | 6.6 | 7.1 |

*Not an example of this invention
[1] E = Excellent
G = Good
F = Fair

As can be seen from the foregoing Table, foam Samples 1-8 all exhibit a very small percentage of open cells, even though these samples contain up to 58% fly ash. Similarly, the k factors of these foams are substantially unchanged from those of Comparative Foams A-D. In addition, foam Samples 1-8 have excellent compressive strength and flame resistance. Friability is good or excellent in almost all cases, and is fair even at 58% fly ash content in the foam. The foam forming formulation used in these foams provides an unfilled foam having a compressive modulus of between 182 and 288 psi.

Comparative foams E-H are prepared from a foam formulation which provides an unfilled foam with a compressive modulus of 371 psi. Although good compressive, thermal and flame resistance properties are obtained, these foams are much more friable, at an equivalent loading of fly ash, than foam Samples 1-8.

EXAMPLE 2

In this example, the effects of fly ash on the thermal insulative properties of foams are compared to those of $CaCO_3$, another common filler for plastics. The following base formulation is used in preparing foam Samples 9-11 and Comparative Foams I-L:

| | |
|---|---|
| Liquid MDI[1] | 200 parts by weight |
| Poly(ethylene oxide) diol (200 molecular weight) | 76 parts by weight |
| Potassium Acetate solution[2] | 4.2 parts by weight |
| Silicone Surfactant[3] | 2.5 parts by weight |
| Tertiary Amine Catalyst[4] | 2 parts by weight |
| Monochloromonofluoromethane | 60 to 80 pbw |
| Filler | 188 parts by weight |

[1] A modified diphenylmethanediisocyanate commercially available as Mondur MR from Mobay Chemical Co.
[2] 25% Potassium acetate in diethylene glycol
[3] DC-193, from Dow Corning Corporation
[4] DMP-30, from Rohm and Haas Company Foams are prepared as described in Example 1. The type and amount of filler used in each Sample or Comparative foam are indicated in Table II following. Each of foam Samples 9-11 and Comparative foams I-L are tested for density k factor and aged k factor (90 days aging). For comparison, a commercially available rigid foam, Thermax sheathing (without facer, available from Celotex Corporation) is also evaluated. The results are as indicated in Table II following.

TABLE II

| Sample or Comp. Foam No. | Filler | Particle Size (microns) | Foam Density (pcf) | K Factor Values Initial | K Factor Values 90 days |
|---|---|---|---|---|---|
| 9 | C-Fly Ash[1] | 11.7 | 2.28 | 0.120 | 0.169 |
| 10 | F-Fly Ash[2] | 15.1 | 2.28 | 0.131 | 0.171 |
| I* | $CaCO_3$ | 12.6 | 2.24 | 0.141 | 0.182 |
| J* | $CaCO_3$ | 8.7 | 2.22 | 0.135 | 0.178 |
| 11 | C-Fly Ash | 11.7 | 1.93 | 0.129 | 0.171 |
| K* | $CaCO_3$ | 12.6 | 1.97 | 0.148 | 0.184 |
| L* | $CaCO_3$ | 8.7 | 1.98 | 0.143 | 0.183 |
| M* | Fiberglass[3] | — | 1.84 | 0.138 | 0.173 |

*Not an example of this invention.
[1] Type "C" fly ash
[2] Type "F" fly ash
[3] Thermax sheathing without facer, available from Celotex Corporation.

As can be seen from the data in Table II, much better k factors are obtained when fly ash is used instead of $CaCO_3$ as the inorganic filler, when foams of similar density are compared. This improvement in k factor is seen in both the initial and aged k factor results. The foams of this invention are very comparable to the commercial foam.

EXAMPLE 3

The following polyurethane-modified polyisocyanurate formulation Sample Nos. 12-16, when filled with about 10-80, preferably about 30-60% fly ash, provide foams having good k-factor and low friability.

TABLE III

| | Sample Number | | | | |
|---|---|---|---|---|---|
| | 12 | 13 | 14 | 15 | 16 |
| Liquid MDI[1] (Index) | 420 | 2.0 | 280 | 210 | 340 |
| Polyether Polyol A[2] | 76 | — | — | — | — |
| Polyol Blend A[3] | — | 106.5 | — | — | — |
| Polyol Blend B[4] | — | — | 106.5 | — | — |
| Polyol Blend C[5] | — | — | — | — | 78.5 |
| Polyester polyol A[6] | — | — | — | 137 | — |
| Amine Catalyst[7] | 2.0 | 2.0 | 2.0 | 2.0 | 2.0 |
| Potassium Acetate solution[8] | 4.2 | 4.2 | 4.2 | 4.2 | 4.2 |
| Silicone Surfactant[9] | 1.5 | 1.5 | 1.5 | 1.5 | 1.5 |
| Monochloromonofluoromethane | 50 | 60 | 50 | 60 | 60 |
| Density (unfilled) lb/ft$^3$ | 1.59 | 1.48 | 1.84 | 1.63 | 1.49 |
| Compressive Modulus, psi | 186 | 182 | 268 | 248 | 232 |

[1] A modified diphenylmethanediisocyanate commercially available as Mondur MR from Mobay Chemical Co.
[2] A 400 molecular weight poly(ethylene oxide) diol
[3] A blend containing 35.6% of a 200 molecular weight poly(ethylene oxide) and 64.4% of a Polyester Polyol A.
[4] A blend of 35.6% Polyether Polyol A and 64.4% Polyester Polyol A
[5] A blend of 12.7% Polyether polyol A and 82.3% Polyester Polyol A
[6] PS 3152, available from Stepan Company
[7] DMP-30, from Rohm and Haas Company
[8] 25% Potassium acetate in diethylene glycol.
[9] DC-193, from Dow Corning Corporation

What is claimed is:

1. A closed cell, rigid, polyurethane-modified polyisocyanurate foam containing from about 10 to about 80 percent by weight of the foam of fly ash, which polyurethane-modified polyisocyanurate foam is prepared from a polyurethane-modified polyisocyanurate foam-forming composition which when foamed to a density of about 1.75 pounds per cubic foot in the absence of the fly ash, forms a foam having a compressive modulus of about 150 to 325 pounds per square inch.

2. The polyurethane-modified polyisocyanurate foam of claim 1 wherein said foam-forming composition comprises an organic polyisocyanate, an organic isocyanate-reactive compound, a blowing agent and an isocyanate trimerization catalyst.

3. The polyurethane-modified polyisocyanurate foam of claim 2 wherein said organic isocyanate-reactive compound has an average equivalent weight of about 100 to about 500.

4. The polyurethane-modified polyisocyanurate foam of claim 3 wherein said organic isocyanate-reactive compound is a polyether polyol or a polyester polyol.

5. The polyurethane-modified polyisocyanurate foam of claim 4 wherein said foam-forming composition has an isocyanate index of about 200–500.

6. The polyurethane-modified polyisocyanurate foam of claim 5 wherein said blowing agent comprises a low boiling halogenated alkane.

7. The polyurethane-modified polyisocyanurate foam of claim 6 wherein said polyisocyanate comprises 2,4- and/or 2,6-toluenediisocyanate or 2,4'- and/or 4,4'-diphenylmethanediisocyanate.

8. The polyurethane-modified polyisocyanurate foam of claim 1 which has fewer than 10% open cells.

* * * * *